Patented Aug. 24, 1943

2,327,961

UNITED STATES PATENT OFFICE 2,327,961

NITRO GLYCOL

Edward F. Degering, West Lafayette, Ind., and Austin Sprang, Cincinnati, Ohio, assignors to Purdue Research Foundation, La Fayette, Ind., a corporation of Indiana No Drawing. Application July 17, 1941, Serial No. 402,841

1 Claim. (Cl. 260—635)

Our invention relates to a new and useful nitro glycol. More particularly, it relates to 4-nitro-3,5-heptanediol having the following structural formula:

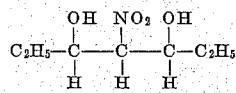

The above compound may be readily prepared by condensing nitromethane with propionaldehyde in a ratio of 1 mole of nitromethane to at least 2 moles of propionaldehyde, in the presence of a small quantity of an alkaline catalyst, such as calcium hydroxide or potassium carbonate, and an auxiliary solvent, such as a lower aliphatic alcohol, as, for example, ethyl alcohol. In carrying out the condensation reaction, it is desirable to add the aldehyde slowly to the alkaline alcoholic solution of nitromethane, at a temperature not in substantial excess of 60° C. When addition of the aldehyde has been completed, the resulting mixture is allowed to stand for three or four days, after which it is neutralized. If calcium hydroxide is used for the condensing catalyst, it may be conveniently neutralized by passing carbon dioxide through the crude reaction mixture, or if potassium carbonate or similar alkaline material is employed as a catalyst, such material may be readily neutralized by adding the calculated quantity of concentrated hydrochloric acid, or other suitable mineral acid. In either instance the precipitate formed in the neutralization step, is filtered off and the nitro glycol obtained as a residue in the form of a syrup, by distilling off the more volatile impurities at reduced pressure. On allowing this viscous liquid to stand at a temperature of from 20-25° C. for several days, crystals of the nitro glycol are observed to separate therefrom. The crystals thus obtained are then recovered by filtration, and further purified by dissolving the same in a warm solution consisting of four parts of toluene, and one part of butanol. After one or two additional crystallizations from such solution, the nitro glycol is obtained in a relatively high state of purity.

The preparation of the nitro glycol of our invention may be illustrated by the following specific example:

Example

To a mixture consisting of 30.5 parts of nitromethane, .6 part of calcium hydroxide, and 25 parts of 95% ethyl alcohol, was slowly added, with thorough agitation, 64 parts of propionaldehyde at a temperature of approximately 50° C. When all of the aldehyde had been added, the resulting mixture was allowed to stand for four days at room temperature, after which it was neutralized by passing gaseous carbon dioxide through the same for a period of one-half hour. The precipitate of calcium carbonate was then filtered off, and the crude nitro glycol obtained in the form of a syrupy residue by subjecting the crude reaction mixture to distillation under vacuum. On allowing this viscous residue to stand for three days, a white crystalline product was observed to separate therefrom. This crystalline material, constituting chiefly 4-nitro-3,5-heptanediol, was filtered off from the mother liquor, and further purified by dissolving the same in a warm solution consisting of 4 parts of toluene, and 1 part of butanol, and allowing said solution to cool slowly. After three additional crystallizations, substantially pure 4-nitro-3,5-heptanediol was obtained. This product melted at 97° C., and was found to contain 47.3 per cent carbon, as compared to 47.46 for theory.

4-nitro-3,5-heptanediol is insoluble in petroleum ether, but very soluble in butanol. This nitro glycol is useful in the preparation of the corresponding amino glycol, which in turn may be converted into higher fatty acid salts, whose aqueous solutions possess valuable capillary active properties. This nitro glycol may likewise be employed in the preparation of numerous other valuable organic compounds. Additional uses of this material will be apparent to those skilled in the art.

Having described our invention, what we claim is:

4-nitro-3,5-heptanediol.

EDWARD F. DEGERING.
AUSTIN SPRANG.